(12) United States Patent
Palenius et al.

(10) Patent No.: US 12,256,406 B2
(45) Date of Patent: Mar. 18, 2025

(54) METHOD AND APPARATUS FOR HANDLING USER EQUIPMENT CAPABILITIES IN A WIRELESS NETWORK

(71) Applicant: Sony Group Corporation, Tokyo (JP)

(72) Inventors: Torgny Palenius, Barsebäck (SE); Svante Alnås, Lund (SE)

(73) Assignee: Sony Group Corporation, Tokyo (JP)

( * ) Notice: Subject to any disclaimer, the term of this patent is extended or adjusted under 35 U.S.C. 154(b) by 314 days.

(21) Appl. No.: 17/775,277

(22) PCT Filed: Oct. 22, 2020

(86) PCT No.: PCT/EP2020/079776
§ 371 (c)(1),
(2) Date: May 7, 2022

(87) PCT Pub. No.: WO2021/094070
PCT Pub. Date: May 20, 2021

(65) Prior Publication Data
US 2022/0394683 A1    Dec. 8, 2022

(30) Foreign Application Priority Data

Nov. 15, 2019   (SE) .................................. 1951322-5

(51) Int. Cl.
*H04W 72/23*    (2023.01)
*H04W 8/24*    (2009.01)
(Continued)

(52) U.S. Cl.
CPC ............ *H04W 72/23* (2023.01); *H04W 8/24* (2013.01); *H04W 48/08* (2013.01); *H04W 48/20* (2013.01)

(58) Field of Classification Search
None
See application file for complete search history.

(56) References Cited

U.S. PATENT DOCUMENTS

| 2019/0239064 A1 | 8/2019 | Stojanovski |
| 2020/0100236 A1 | 3/2020 | Tenny |

(Continued)

FOREIGN PATENT DOCUMENTS

| CN | 102884853 A | 1/2013 |
| CN | 110226338 A | 9/2019 |

(Continued)

OTHER PUBLICATIONS

Apple, Provisioning of Manufacturer-assigned UE Radio Capability ID[online], 3GPP TSG SA WG2 #136 S2-1911901.
(Continued)

*Primary Examiner* — Hong S Cho
(74) *Attorney, Agent, or Firm* — Tucker Ellis LLP

(57) ABSTRACT

A method for operating a database manager entity (130) in a wireless network (10) for handling capability information of a User Equipment, UE, the method comprising: receiving (510), from a network node (110), a first capability ID (51) identifying supported UE capabilities; a set (52) of UE capabilities supported by the UE and the wireless network, which set forms a subset of a full (42,43) set of UE capabilities (41) supported by the UE; and a second capability ID (53) associated with said set (52) of UE capabilities, based on the first capability ID, wherein the second capability ID (53) is assigned (PLMN_ID) by an operator of the wireless network; transmitting (520) the second capability ID and the set (52) of UE capabilities to the network node.

8 Claims, 5 Drawing Sheets

(51) Int. Cl.
*H04W 48/08* (2009.01)
*H04W 48/20* (2009.01)

(56) References Cited

U.S. PATENT DOCUMENTS

| | | | | |
|---|---|---|---|---|
| 2021/0105596 | A1* | 4/2021 | Prabhakar | H04L 67/34 |
| 2022/0386107 | A1* | 12/2022 | Gupta | H04W 8/24 |

FOREIGN PATENT DOCUMENTS

| | | |
|---|---|---|
| CN | 110430564 A | 11/2019 |
| JP | 2022529250 A | 6/2022 |
| JP | 2022549250 A | 11/2022 |
| WO | WO-2018230983 A1 | 12/2018 |
| WO | WO-2019031540 A1 | 2/2019 |
| WO | WO-2019195456 A1 | 10/2019 |
| WO | 2020032491 A1 | 2/2020 |
| WO | WO-2020244911 A1 | 12/2020 |

OTHER PUBLICATIONS

CATT, "Signalling Procedures Containing UE Capability ID", 3GPP tsg_ran\wg2_rl2,Issue tsgr2_106 May 13, 2019 pp. 1-4, R2-1906450.

MediaTekInc., "Correction to deletion of PLMN-assigned UE Radio Capability ID", 3GPP tsg_salwg2_arch,Issue tsgs2_134_sapporo Jun. 24, 2019, pp. 1-4, S2-1907339.

Apple, "Reducing the number of UE Radio Capability IDs", 3GPP tsg_salwg2_arch,Issue tsgs2_ 135_split Oct. 14, 2019, pp. 1-4, S2-1909666.

International Search Report and Written Opinion from corresponding International Application No. PCT/EP/2020/079776, mailed on Feb. 2, 2021, 11 pages.

Office Action and Search Report from corresponding Swedish Application No. 1951322-5, mailed on Jun. 2, 2020, 9 pages.

Sony, et al., "Corrections and improvements of PLMN assigned Capability signaling", 3rd Generation Partnership Project (3GPP) TSG-SA WG2 Meeting #134, Jun. 24-28, 2019, S2-1907016, 26 pages.

3rd Generation Partnership Project (3GPP), "Technical Specification Group Services and System Aspects, Study on Optimisations on UE radio capability signalling (Release 16)", Mar. 2019, 3GPP TR 23.743, V16.0.0, 56 pages.

Ericsson, "Discussion on the service operations for Nucmf_UECapabilityManagement", 3rd Generation Partnership Project (3GPP) TSG-CT WG4 Meeting #93, Aug. 26-30, 2019, C4-193245, 4 pages.

Ericsson, "Pseudo-CR on Data type and openAPI related to Resolve, Assign", 3rd Generation Partnership Project (3GPP) TSG-CT WG4 Meeting #95, Nov. 11-15, 2019, C4-195084, 11 pages.

Spreadtrum Communications, "Container combination of UE capability ID", 3rd Generation Partnership Project (3GPP) TSG_RAN WG2 Meeting #107, Aug. 26-30, 2019, R2-1909089, 4 pages.

Nokia, et al., "Support of RACS in PLMNs with distributed and non-coordinated filtering of UE radio capabilities", 3rd Generation Partnership Project (3GPP) TSG-SA WG2 Meeting #134, Jun. 24-28, 2019, S2-1907073, 5 pages.

\* cited by examiner

METHOD AND APPARATUS FOR HANDLING USER EQUIPMENT CAPABILITIES IN A WIRELESS NETWORK

TECHNICAL FIELD

This disclosure relates to methods and devices for handling capabilities of a wireless terminal in a wireless network. More specifically, solutions are provided for managing migration between capability IDs provided by a terminal vendor or manufacturer IDs, and as provided by an operator of the network.

BACKGROUND

In wireless communication systems, such as various generations provided through the 3rd Generation Partnership Project (3GPP), various generations of specifications have been provided for setting up common rules for setting up and operating both a wireless radio interface between a wireless terminal and a base station, and various levels of operation of the wireless network. In 3GPP documentation, a wireless terminal, or wireless communication device, is commonly referred to as a User Equipment (UE). The term UE will be used going forward in this disclosure, but it may be noted that the proposed solution may apply to other systems than 3GPP systems. A base station defines a cell and is operative to serve a surrounding area with radio access for UEs, by providing radio access to UEs within a cell. A base station is also referred to herein as an access node, and various terms are used in 3GPP for different types of systems or specification. An access network, or Radio Access Network (RAN), typically includes a plurality of access nodes, and is connected to a Core Network (CN) which inter alia provides access to other communication networks. In the so-called 3G specifications, also referred to as the Universal Mobile Telecommunications System (UMTS), the term NodeB is used to denote an access node, whereas in the so-called 4G specifications, also referred to as Long-Term Evolution (LTE), the term eNodeB (eNB) is used. A further developed set of specifications for radio communication are referred to as the 5G type radio communication system (5GS), including the New Radio (NR) technology, wherein the term gNB is used to denote an access node.

UEs can have many different UE capabilities, such as UE radio capabilities, e.g., associated with modem properties or supported functionality in the UE. In order to make various entities of the wireless network aware of the UE capabilities supported by a certain UE, the UE indicates its UE capabilities to the wireless network. This is typically accomplished when the UE registers with the wireless communication network. The UE capabilities can be indicated in different formats, e.g., in terms of parameters or indicators listed in one or more information elements of one or more messages.

In general, the UE may indicate multiple different UE capabilities, which may for example concern frequency bands of a wireless communications system, supported frequency band combinations, support of different modulation and demodulation formats, maximum data demodulation rate, 3GPP release version, or specific functions such as relaying or the support of device-to-device communication. In the existing technology, the UE capabilities are indicated in a rather static manner to the network. The UE capabilities may be indicated upon initial network registration and in some handover scenarios, in response to the network sending a UE capability enquiry. For initiating an update of the capability information from the UE side, the UE may need to re-register in the network.

With the increasing amount of UEs operating in the wireless networks, and the concurrently increasing number of supportable services, features, radio frequency bands etc., the data size of the UE capabilities continues to grow. Current 3GPP releases already have problems with the size of the UE capabilities. Studies approved within 3GPP to investigate ways of improvement have suggested allocating UE capabilities IDs for the set of UE capabilities. This concept has been suggested under the term RACS ID (ID for Radio Access Capability Signaling). A UE capability ID (or UE Radio Capability ID) may be manufacturer-assigned or manufacturer-specific, determined by the UE manufacturer, or network-specific for a certain PLMN (Public land mobile network) or a part thereof, determined e.g. by the operator of the network.

The manufacturer-assigned UE Capability ID may define the complete set of UE Radio Capabilities for a UE type or model. A PLMN-assigned UE Capability ID may also define the complete set, but alternatively only a subset the complete set of UE Radio Capabilities, in which UE capabilities that are not relevant for the wireless network is filtered out, e.g. UE capabilities related to frequency bands not used in the wireless network.

An SA2 study regarding RACS ID is described in TR 23.743 and the normative work is specified in 23.501 and 23.502 and corresponding specifications for EPC. When RACS is used the UE shall send its UE Capability ID to the wireless network upon registration.

A database manager entity known as the UE radio Capability Management Function (UCMF) handles the UE Radio Capability management in the network. In case the network uses PLMN-assigned UE Capability IDs for RACS operation, and the UE registers itself with a PLMN-assigned Capability ID, the UCMF may configure the network with the set of UE radio capabilities defined by this ID so that the core network and radio access network (RAN) can employ the UE radio capabilities without needing to send them over the radio interface. However, if the network is based on PLMN-assigned capability IDs but the UE is not configured with the PLMN assigned Radio Capability ID, the UE has to signal the complete set (possibly filtered) of the UE Radio Capability to the wireless network. The UE may on the other hand have a Manufacturer-assigned UE Capability ID which defines the complete set of UE Radio Capability IDs, which the wireless network does not use.

Accordingly, there is a need for techniques that allow for efficiently indicating supported UE capabilities of a UE to the wireless communication network, in particular when the UE and the wireless network make use of different capability IDs, such as different RACS types.

SUMMARY

A general object is to provide improved solutions for handling UE capability information in a wireless network. Solutions targeting this issue are set out in the independent claims. Further advantageous embodiments are laid out in the dependent claims.

According to a first aspect, a method is provided for operating a database manager entity in a wireless network for handling capability information of a UE, the method comprising:

receiving, from a network node, a first capability ID identifying supported UE capabilities;

determining a set of UE capabilities supported by the UE and the wireless network, which set forms a subset of a full set of UE capabilities supported by the UE; and a second capability ID associated with said set of UE capabilities, based on the first capability ID, wherein the second capability ID is assigned by an operator of the wireless network;

a set of UE capabilities supported by the wireless network, and a second capability ID associated with said set of UE capabilities, based on the first capability ID, wherein the second capability ID is assigned by an operator of the wireless network;

transmitting the second capability ID and the set of UE capabilities to the network node.

According to a second aspect, a database manager entity in a wireless network is provided, configured for handling capability information of a UE, wherein the database manager entity comprises logic configured to:

receive, from a network node, a first capability ID identifying supported UE capabilities;

determine a set of UE capabilities supported by the UE and the wireless network, which set forms a subset of a full set of UE capabilities supported by the UE; and a second capability ID associated with said set of UE capabilities, based on the first capability ID, wherein the second capability ID is assigned by an operator of the wireless network;

transmit the second capability ID and the set of UE capabilities to the network node.

This way, even though the wireless network does not employ the capability ID which the UE holds and transmits to the network, an algorithm usable for obtaining the appropriate set of UE capabilities is provided.

BRIEF DESCRIPTION OF THE DRAWINGS

Various embodiments will be described with reference to the drawings, in which.

DETAILED DESCRIPTION OF EMBODIMENTS

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Figure 1:
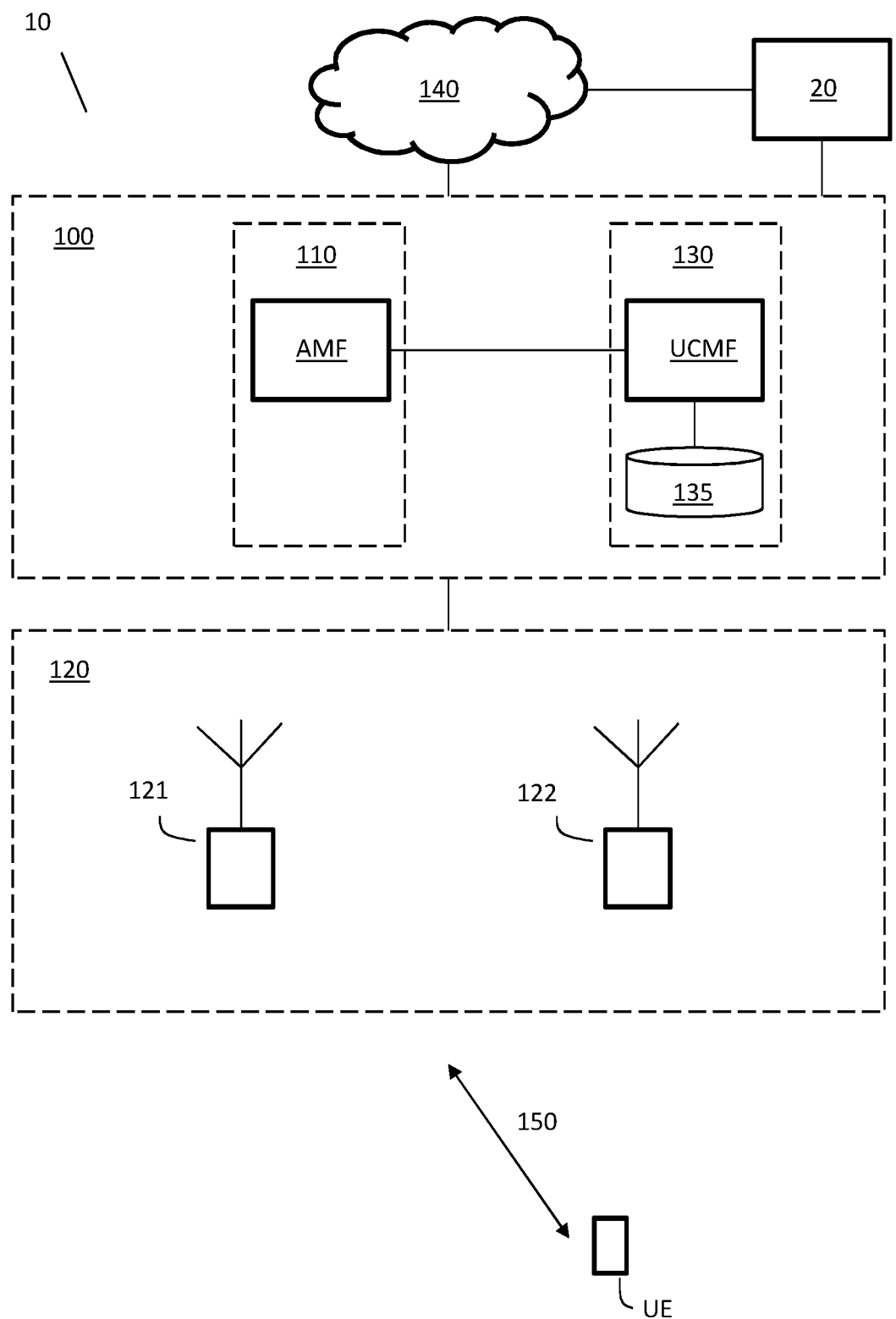
FIG. 1 schematically illustrates a wireless network in which the various embodiments presented herein may be set out.

FIG. 1 schematically illustrates a wireless network 10 of a wireless communication system. The wireless network comprises a core network (CN) 100 which provides access to other communication networks, such as the Internet 140, and an access network 120 for communication with wireless terminals, of which one UE is shown. The access network 120 may include a plurality of access nodes 121, 122 configured to serve various cells. The access network 120 may e.g. be a Radio Access Network (RAN). The UE is a wireless terminal configured to communicate wirelessly with access nodes of the access network 120, such as by radio. UEs may be stationary or mobile.

The CN 100 may include various core network nodes, defined in accordance with a certain 3GPP release or in accordance with another set of wireless communication standards. Such CN entities may include at least one node for handling mobility of UEs, such as an Access & Mobility management Function (AMF). Other CN entities may include further nodes realizing various functions, which are not shown, such as a Session Management Function (SMF), a User Plane Function (UPF), and one or more gateways such as a Serving Gateway and a PDN Gateway.

Each access node 121, 122 may in various embodiments be referred to as a base station, serving one cell each. The access network 120 may comprise a number of access network groups, and each such access network group may be supported and served by one or more AMFs 110, at least for UE mobility management. Each access network group may comprise a plurality of access nodes. In various embodiments, an access network group is defined as a portion of the entire access network 120, which is served by one AMF or one AMF set, which AMF set may include several AMFs. An AMF set is defined in 3GPP and contains a group of AMFs that may for example be able to replace each other without unnecessary signaling to the UE.

For the purpose of managing UE capabilities in the network 10, a central or global CN node 130 may be included as a database manager entity 130, comprising or being connected to a central or global database 135. The database 135 may be configured to store UE capabilities, also referred to as capability information herein, for the network 10. The database 135 may further store capability IDs associated with various combinations, parts, or subsets of such capability information. In various embodiments, the node 130, possibly including the database 135, may realize a UE radio Capability Management Function (UCMF). The database manager entity 130 may thus be configured to store UE capability information, i.e. the actual data defining e.g. support for radio bearers, frequency band etc. for a UE, as well as capability IDs. A capability ID is in this context a number of bits which uniquely identifies the set of capability information for the UE or a specific version of a UE. As noted, such capability IDs may be assigned by the wireless network 10, under control by an operator, or by a manufacturer of the UE. How these IDs are provided or calculated may differ. In various embodiments, a capability ID may be or include a hash of an associated set of UE capability information. Typically, the wireless network 10 may define or create its own capability IDs using a common algorithm, so as to obtain a PLMN assigned ID, PLMN_ID. Moreover, different PLMN_ID may locally be assigned in the wireless network 10 for different but identical UEs, from a UE capability point of view, e.g. dependent on where and when they register with an access network 120 of the wireless network. For a manufacturer specific solution, a capability ID, MANU_ID, may be assigned by the UE manufacturer in which case it is accompanied with the UE manufacturer information (e.g. TAC field in the PEI) either as part of the MANU_ID or as part of the Capability Set that is represented by MANU_ID or as addition identity together with MANU_ID. In this case, the capability ID uniquely identifies a set of UE Radio capabilities for this manufacturer, and together with this UE manufacturer information uniquely identify this set of UE Radio capabilities in any PLMN.

Figure 2:
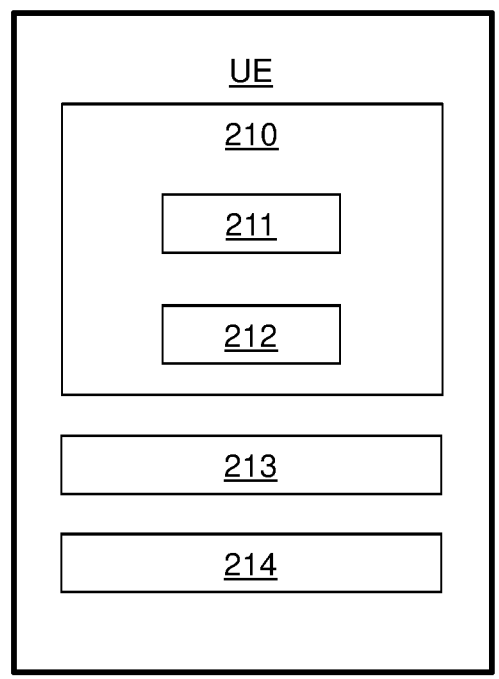
FIG. 2 schematically illustrates elements included in a UE configured for use in accordance with various embodiments.

FIG. 2 schematically illustrates a UE, such as the UE of FIG. 1. The UE may be configured for communication with the access network 120, and comprise a transceiver 213, such as a radio receiver and transmitter for communicating with the access network 120 through at least an air interface. The UE further comprises logic 210. The logic 210 may comprise for example a controller or microprocessor 211. The logic may also comprise or be connected to a data storage device 212 configured to include a computer readable storage medium. The data storage device 212 may include a memory and may be, for example, one or more of a buffer, a flash memory, a hard drive, a removable media, a volatile memory, a non-volatile memory, a random access memory (RAM), or other suitable device. In a typical arrangement, the data storage device 212 includes a non-volatile memory for long term data storage and a volatile memory that functions as system memory for the controller 211. The data storage device 212 may exchange data with the controller 211, e.g. a processor, of the logic 210 over a data bus. The data storage device 212 is considered as a non-transitory computer readable medium. One or more processors of the controller 211 of logic 210 may execute instructions stored in the data storage device 212 or a separate memory in order to carry out operation of the UE, as outlined herein. The UE may further comprise a data memory 214 for storing UE capability information and associated data, such as a capability ID. The data memory 214 may be or form part of the data storage device 212, or be a separate entity, but is specifically indicated in the drawing to identify the intended difference between storing code associated with a computer program or operating system in data storage 212 used for controlling and operating the UE, from capability data which can be accessed and sent to other nodes of the network 10. It may be noted that the UE clearly may include other features and functions than those identified, such as e.g. one or more antennas, a user interface, a power source and so on, but these components are not shown in FIG. 2 for clarity reasons.

Figure 3:
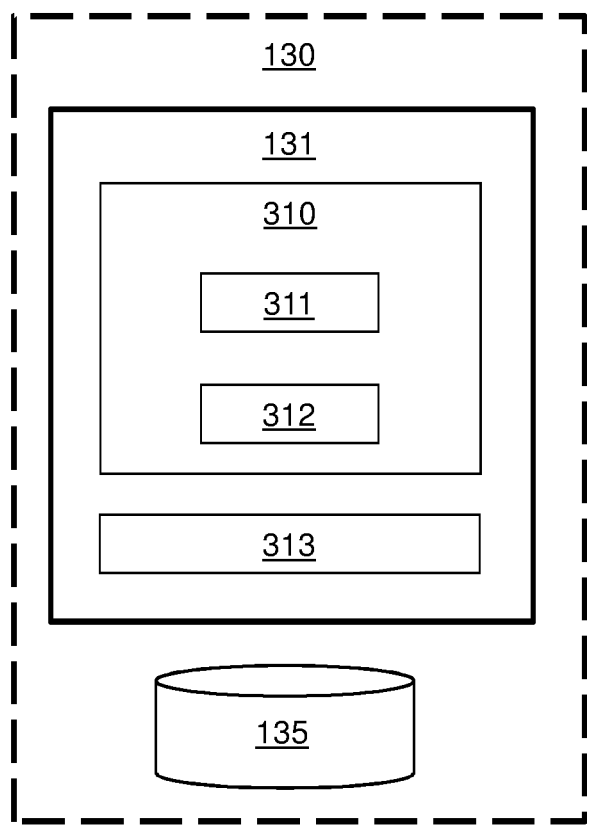
FIG. 3 schematically illustrates elements included in a database manager entity of a core network configured in accordance with various embodiments.

FIG. 3 schematically illustrates the network node 130, acting as database manager entity 130 in the core network 100. The network node 130 is or comprises a function for handling UE mobility in the network 10. The core network node 130 may thus operate as a control function 131 realizing a UCMF. The control function 131 comprises CN node logic 310. The CN node logic 310 may comprise for example a controller or microprocessor 311. The logic 310 may also comprise or be connected to a data storage device 312 configured to include a computer readable storage medium. The data storage device 312 may include a memory and may be, for example, one or more of a buffer, a flash memory, a hard drive, a removable media, a volatile memory, a non-volatile memory, a random access memory (RAM), or other suitable device. In a typical arrangement, the data storage device 312 includes a non-volatile memory for long term data storage and a volatile memory that functions as system memory for the control unit. The data storage device 312 may exchange data with a processor 311 of the logic 310 over a data bus. The data storage device 312 is considered as a non-transitory computer readable medium. One or more processors 311 of the logic 310 may execute instructions stored in the data storage device or a separate memory in order to carry out operation of the CN node 130, as outlined herein. The CN node 130 may further comprise one or more transceivers or interfaces 313 for communication with other entities, including the AMF 110. The control function 131 realizing a UCMF is connected to a global database 135 for storing UE capability information and associated data, such as capability IDs, preferably for a plurality of UEs. The database 135 may physically be stored in a separate memory unit, connected to the control function 131 handling UE mobility. In other embodiments, the database 135 is realized in a common entity 110 as the control function 131 handling UE mobility. For the sake of illustration, the drawing shows that the network node 130 includes both the entity 131 and the database 135.

Figure 4:
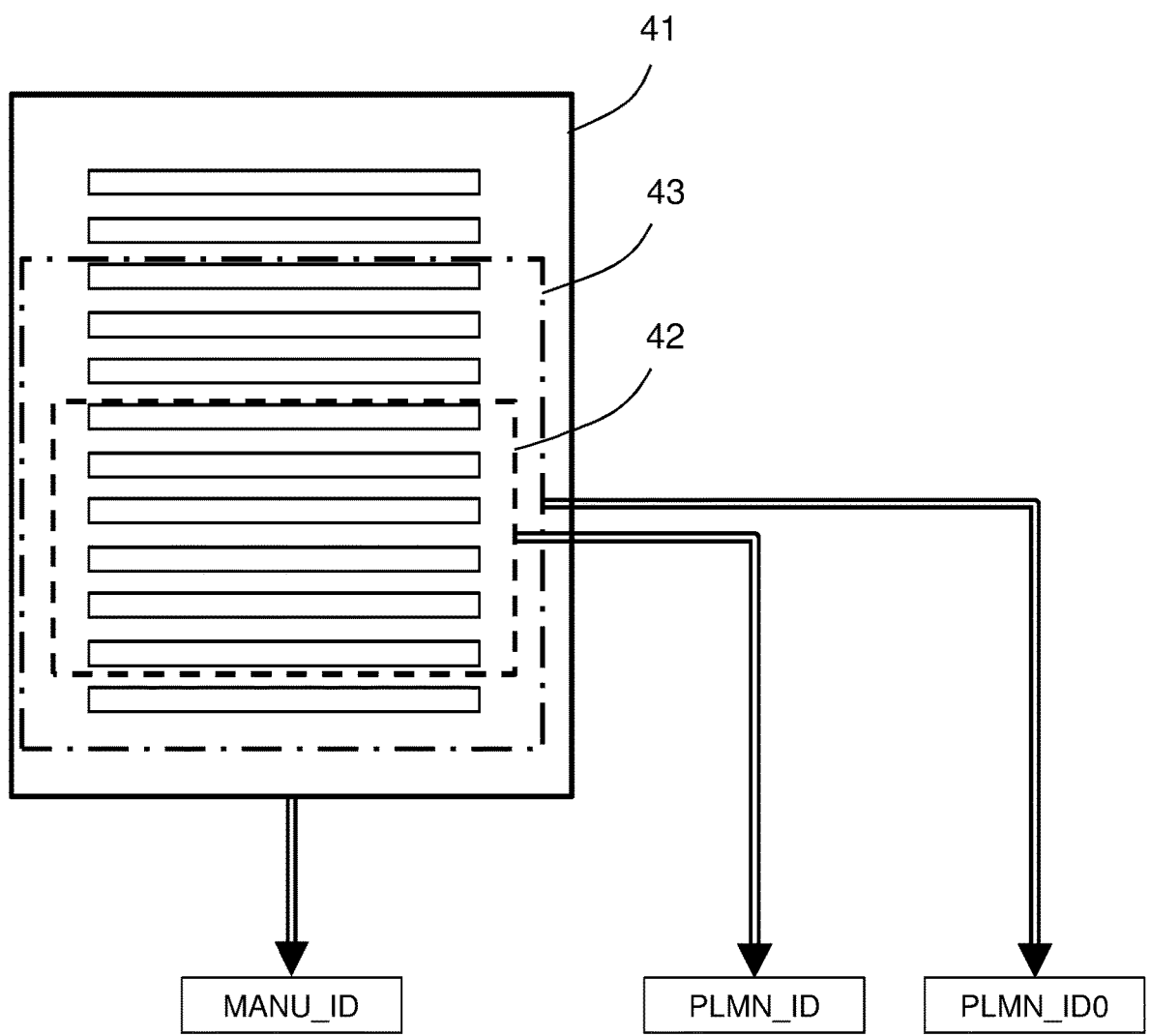
FIG. 4 schematically illustrates various UE capability sets and corresponding IDs.

FIG. 4 schematically illustrates the relationship between various sets of UE capabilities and the associated capability IDs. Herein, a complete set of UE capabilities for the UE may be referred to as a first set 41 of supported UE capabilities, for the UE. This is schematically illustrated as containing a number of elements, which may each indicate support for a certain feature in wireless communication. The first set 41 provides the full or complete set of UE capabilities supported by the UE, as defined by the manufacturer. Typically, this complete set may be valid for all UEs of a certain type, model or software version. Moreover, a MANU_ID, provided by the manufacturer OEM, may be linked to identify the first, complete, set of UE capabilities.

A certain wireless network 10, in particular an access network 120 of the wireless network 10, may be arranged to only make use of a subset of the full set of UE capabilities. This subset may be identified by means of one or more filters, provided by the access network to the UE, which configures the UE to report the set 42 of UE capabilities that is relevant for the access network. This may thus be referred to as a second set 42 of supported UE capabilities, which may be the same as the full first set 41, but typically a subset of the first set 41 of UE capabilities. Moreover, a PLMN_ID may be linked to identify the second set of UE capabilities. In various embodiments, the PLMN_ID may be configured as a hash of the second set of UE capabilities.

In the wireless network, changes of e.g. operating characteristics, equipment, settings or regulations may lead to a change in supported UE capabilities. This may lead to a need to change the definition of supported UE capabilities from one set 42 to another set 43 of UE capabilities. Moreover, a situation may in various embodiments occur that two or more different PLMN-assigned capability IDs in the network have been defined, e.g. on AMF level, which cover or include the same set of supported UE capabilities. For any one of these reasons, it may occur that one network-assigned ID shall be changed to another network-assigned ID. In the drawing, such different IDs are indicated as PLMN_ID and PLMN_ID0. Although the corresponding UE capabilities 42 and 43 are illustrated as being different, they may in various embodiments cover the same subset of the complete set of UE capabilities 41.

An overall objective behind various embodiments provided herein is to minimize signaling over the radio interface, i.e. between the UE and the RAN 120. Specifically, it is an object to minimize such signaling in cases where a UE has first capability ID identifying supported UE capabilities, but where the wireless network 10 operates by using a different, second, capability ID.

Figure 5A:
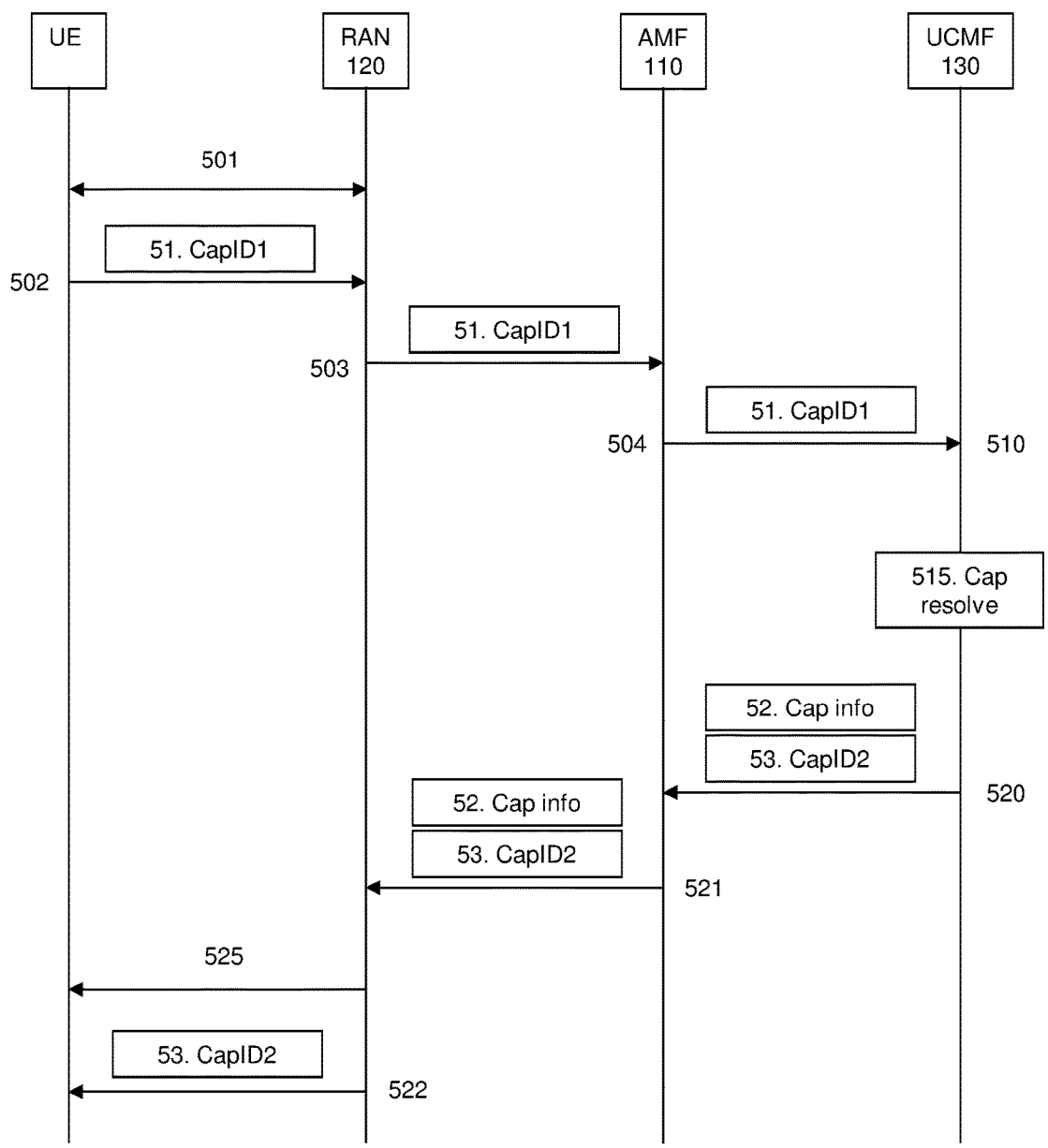
FIG. 5A shows a signal diagram for various embodiments.

In accordance with a general aspect, with reference to which one embodiment will be outlined with reference to FIG. 5A, a method is provided for operating a database manager entity 130 in a wireless network 10 for handling capability information of a UE, the method comprising:
  receiving 510, from a network node 110, a first capability ID 51 identifying supported UE capabilities;
  determining 515 a set 52 of UE capabilities supported by the wireless network, and a second capability ID 53 associated with said set 52 of UE capabilities, based on the first capability ID, wherein the second capability ID 53 is assigned PLMN_ID by an operator of the wireless network; and
  transmitting 520 the second capability ID and the set 52 of UE capabilities to the network node.

Moreover, according to a second general aspect, a database manager entity 130 in a wireless network 10 is provided, configured for handling capability information of a UE, wherein the database manager entity comprises logic 310 configured to
  receive 510, from a network node 110, a first capability ID 51 identifying supported UE capabilities;
  determine 515 a set 52 of UE capabilities supported by the wireless network and a second capability ID 53 associated with said set 52 of UE capabilities, based on the first capability ID, wherein the second capability ID 53 is assigned by an operator of the wireless network;
  transmit 520 the second capability ID and the set 52 of UE capabilities to the network node.

This way, even though the wireless network does not employ the capability ID which the UE holds and transmits to the network, an algorithm for obtaining the appropriate set of UE capabilities is provided.

Moreover, the network 10 is configured by transmitting the appropriate, second capability ID for future use within the network 10 and possibly for transmission to the UE to replace the first capability ID.

One example embodiment will now be described primarily with reference to FIG. 5A. Every UE accessing a PLMN 10 for the first time, where the network is using PLMN-assigned capability IDs, needs to send the complete set 41 of UE Capabilities to the network over the radio interface. This should not be necessary when the UE has a Manufacturer-assigned UE Capability ID and sends this to the network 10. Rather, it is suggested that the UCMF 130 is configured to obtain the relevant set of UE Capabilities based on the Manufacturer-assigned ID, under the condition that this information is available in a central database 135 and has been published by the UE vendor or manufacturer. Therefore, it is proposed that the UE can send the Manufacturer-assigned capability ID MANU_ID to the network (for receipt in the UCMF 130), even if the network 10 is using PLMN-assigned IDs. The database manager entity operating as e.g. UCMF is configured to obtain the set of UE radio capabilities from the database 135. Thereby the UE radio capabilities are available in the UCMF without the UE having to send radio capabilities over the radio interface. Then the UCMF 130 can match the UE capabilities 52 to a PLMN-assigned ID PLMN_ID in a corresponding way as if the PLMN_ID had been received from the UE. The UCMF 130 is further arranged to send the set of UE Radio Capabilities 52 together with the PLMN-assigned ID PLMN_ID to the AMF, which in turn will operate to configure the UE in accordance with the PLMN-assigned capability ID PLMN_ID, and the rest of the network can be configured with the corresponding capabilities.

FIG. 5A illustrates the UE, the RAN, the AMF and the UCMF, in a 3GPP embodiment, including signaling between these entities.

Step 501 indicates initiation of registration of the UE to the network 10, including RRC signaling between the UE and the RAN 120. This may inter alia involve the UE sending an RRC message to register to the network 10.

In this process, the UE and the RAN 120 node negotiates the UE Radio Capabilities, during which UE sends 502 the MANU_ID 51, even though the network 10 uses PLMN-assigned capability IDs instead of manufacturer-assigned capability IDs.

The RAN, such as an access node 121 of the RAN, sends 503 a registration request to the AMF 110, including the MANU_ID 51.

The AMF 110 sends 504 the MANU_ID 51 to the UCMF 130 to get UE radio capabilities.

The UCMF 130, which uses PLMN-assigned IDs, receives 510 the MANU_ID 51 from the AMF. The MANU_ID 51 which identifies supported UE capabilities as provided by the manufacturer or vendor.

The UCMF thereby determines 515 a set 52 of UE capabilities supported by the wireless network 10, and a second capability ID 53 associated with said set 52 of UE capabilities, based on the received capability ID MANU_ID 51. The second capability ID 53 is assigned as a PLMN_ID by an operator of the wireless network, herein meaning assigned by a process or a set of rules determined or under control by the operator. The step 515 may correlate to a Nucmf_UECapabilityManagement Resolve service operation, as provided e.g. in section 5.2.18.3 of TS23.502. Examples of this step will be further outlined with reference to FIG. 6.

The UCMF thereby responds 520 with the PLMN_ID 53 and the set 52 of UE capabilities to the AMF.

The AMF further sends 521 the PLMN_ID 53 and the set 52 of UE capabilities to the RAN 120 for configuration of the connection with the UE.

The RAN 120 may further complete the registration 525 of the UE, and may configure 522 the UE with the PLMN_ID 53 for future use by the UE.

Figure 6:
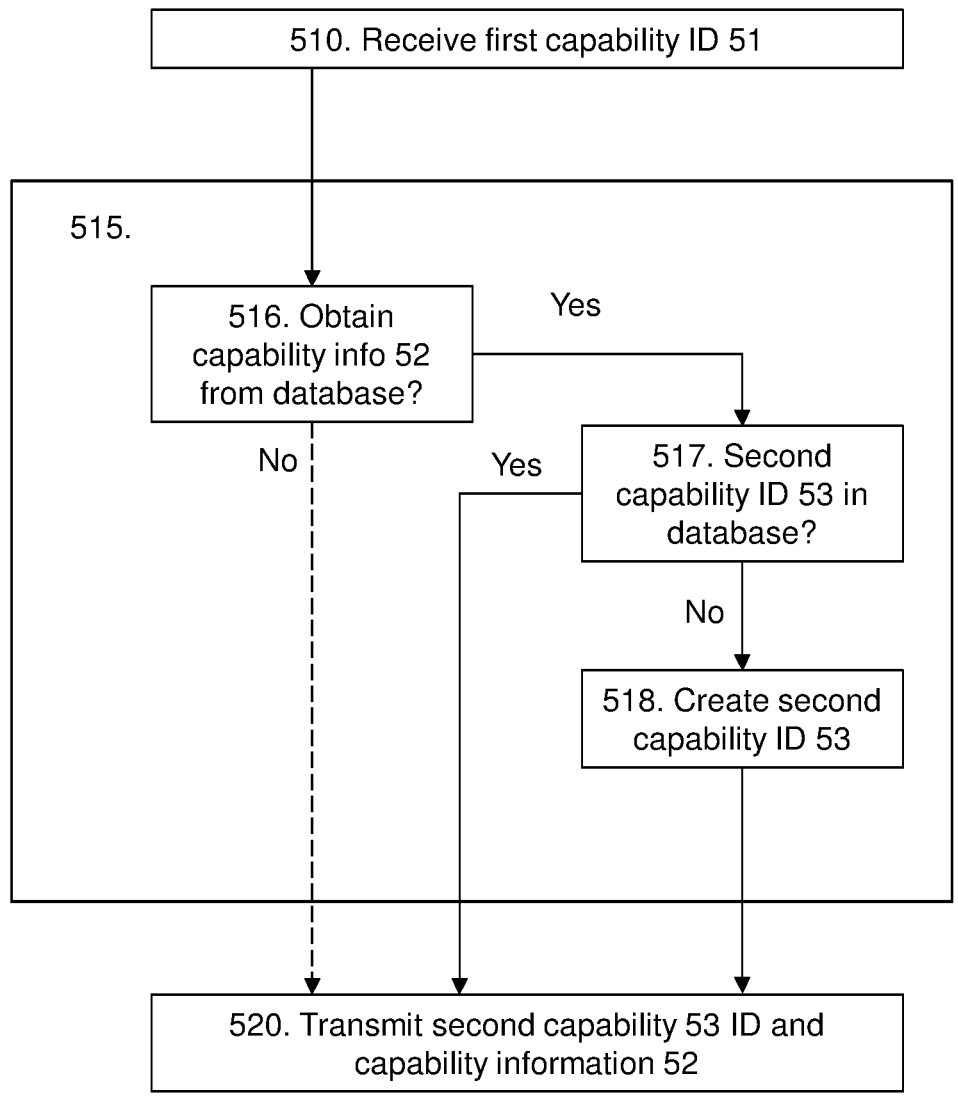
FIG. 6 shows various logical process steps carried out in a different embodiments of a method as proposed herein.

FIG. 6 illustrates various steps of the general method as a flow chart. Specifically, various steps that may be included in the step of determining 515 a set 52 of UE capabilities supported by the wireless network, and a second capability ID 53 associated with said set 52 of UE capabilities, based on the received first capability ID 51.

Figure 5B:
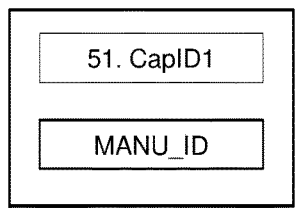
FIGS. 5B-5D schematically illustrates various types of UE capability IDs employed in different embodiments.
Figure 5C:
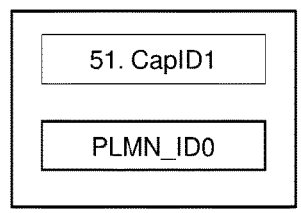
Figure 5D:
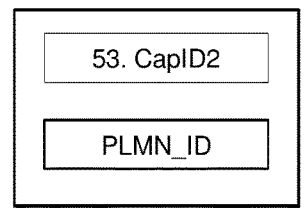

In one embodiment covered by FIG. 6, corresponding to the embodiment described with reference to FIGS. 5A, 5B and 5D, the first capability ID 51 is MANU_ID.

The step 515 of determining executed by the database manager entity 130, e.g. operating as UCMF, may thus include the logical step of attempting 516 to obtain capability info 52 from the database 135, based on the received MANU_ID. If there is such a set 52 of UE capabilities, this set 52 is retrieved from database storage for transmission 520 to the AMF 110. The set 52 of UE capabilities includes information on inter alia radio capabilities, including frequency bands, supported by the UE. In one embodiment, the set 52 of UE capabilities may be a complete set of UE capabilities supported by the UE. In another embodiment, the set 52 of capabilities may be a subset of the complete set. The subset may thus form a filtered version of the complete set, and only include the capabilities which are supported or used in the wireless network 10 or the RAN 120. For example, the wireless network 10 may be configured to make use of a certain set of bearers, defined in the subset of capabilities, while the UE as such additionally supports further bearers as defined by the complete set of capabilities.

In one embodiments where the database 135, from which the UCMF obtains data, stores the complete set of capabilities identified by MANU_ID 51, the UCMF may in one embodiment apply a stored filter for obtaining the relevant subset 52 of capabilities before transmission 520 of that set 52 of capabilities to the AMF 110. In another embodiment, the UCMF may be configured to transmit the complete set of capabilities 52 for subsequent filtering in the MAF 110 or in the RAN 120, to obtain the relevant subset for the wireless network 10.

If there is no set 52 of UE capabilities that may be found using MANU_ID as input, the process may terminate by either transmitting 520 an indication of a null answer, or no answer at all, to the AMF 110.

Further, the step 515 of determining may include the logical step of attempting 517 to obtain a second capability ID, PLMN_ID, 53 from the database 135. The objective is here to obtain a network-assigned capability ID, PLMN_ID, that is used in the wireless network 10 for identifying the capabilities used in UE configuration. The second capability ID 53, PLMN_ID, is associated with the obtained set 52 of capabilities, and identifies said subset of the complete UE capabilities, which subset of capabilities are supported or used in the wireless network 10 or the RAN 120.

If a prerecorded network-assigned second capability ID 53, PLMN_ID, associated with the set 52 of UE capabilities may be obtained from the database 135, the process may continue with transmitting 520 the obtained second capability 53 ID and the obtained capability information 52 to the AMF 110.

If, on the other hand, there is no PLMN_ID corresponding to the first capability ID 51, the database manager entity 130 may be configured to create 518 the second capability ID. The process may thus continue with transmitting 520 the created second capability 53 ID and the obtained capability information 52 to the AMF 110.

The embodiment described above is presented as following the logical steps of:

MANU_ID 51→UE capabilities 52→PLMN_ID 53.

However, it should be noted that in other embodiments the required information, i.e. the set 52 of capabilities and the second, network-assigned, PLMN_ID 53 to be transmitted in step 520, may alternatively be obtained with the following order:

MANU_ID 51→PLMN_ID 53→UE capabilities 52.

In such an embodiment, the database 135 may comprise a mapping from MANU_ID to PLMN_ID. Based on input of MANU_ID 51, the UCMF may thus obtain a prestored PLMN_ID 53, which as such identifies or points to the set 52 of capabilities in the database 135.

An alternative embodiment and use case will now be described, also with reference to FIG. 6. This embodiment corresponds to the embodiment shown in FIGS. 5A, 5C and 5D, where the first capability ID 51 is network-assigned.

The general aspect of the method and the database manager entity 130 as outlined above may further be used for updating a network-assigned ID. Such an embodiment is related to the first capability ID 51 is an ID PLMN_ID0 which is previously assigned by the operator of the wireless network. It may have been previously communicated to and stored in the UE, or it may only be stored in a local memory or database connected to the AMF 110. In various embodiments, network-assigned IDs may be created temporarily, e.g. at the AMF 110, e.g. for use in mobility management of a connected UE. Such temporary IDs may subsequently be updated to more permanent IDs, e.g. in the UCMF.

Furthermore, the UCMF may be configured to optimize use of capability IDs, e.g. in view of an increasing number of UEs and UE types on the market. It may thus be determined, e.g. in the UCMF, that a number of different types of UEs have a common set of UE capabilities that are sufficient for proper configuration of their connection to the wireless network 10. In order to limit the number of capability IDs, the UCMF may thus be configured to limit the number of IDs by assigning the same network-assigned ID to different types of UEs, even though the complete set of UE capabilities for those different types of UEs may differ.

With reference to FIG. 6 and FIG. 4, the step 515 of determining executed by the database manager entity 130, e.g. operating as UCMF, may thus include the logical step of attempting 516 to obtain capability info 52 from the database 135, based on a received PLMN_ID0. As noted, this ID PLMN_ID0 as received from the AMF 110 may originate from the UE or from the AFM 110. If there is no such set 52 of UE capabilities that may be found using PLMN_ID0 as input, the process may terminate by either transmitting 520 an indication of a null answer, or no answer at all, to the AMF 110.

Next, the step 515 of determining may include the logical step of searching 517 for a second capability ID, PLMN_ID, 53 in the database 135. If such a second capability ID 53 ID, PLMN_ID is available in the database 135, the process may continue with transmitting 520 the obtained second capability 53 ID and the obtained capability information 52 to the AMF 110.

Various embodiments have been described herein, while the invention is defined by the terms of the claims.

The invention claimed is:

1. A method for operating a core network node in a wireless network for handling capability information of a User Equipment (UE), the method comprising:
   receiving, from an access network of the wireless network, a registration request for the UE, wherein the registration request includes a first capability ID (MANU_ID) identifying supported UE capabilities assigned by a manufacturer of the UE;
   sending the first capability ID to a database manager entity to obtain radio capability information for the UE;
   receiving, from the database manager entity:
      a set of UE capabilities supported by the UE and the wireless network, and
      a second capability ID (PLMN_ID) associated with the set of UE capabilities, based on the first capability ID, wherein the second capability ID is assigned by an operator of the wireless network; and
   sending the second capability ID and the set of UE capabilities to the access network.

2. The method of claim 1, wherein the first capability ID originates from the UE.

3. The method of claim 1, wherein sending of the second capability ID and the set of UE capabilities configures the access network to connect with the UE.

4. The method of claim 1, wherein the core network node is an Access and Mobility management Function (AMF) of the wireless network.

5. A core network node configured to handle capability information of a User Equipment (UE), the core network node comprising:
   a processor coupled to computer-readable storage medium having instructions stored thereon, wherein the processor, when executing the instructions, is configured to carry out the method of claim 1.

6. The core network node of claim 5, wherein the first capability ID originates from the UE.

7. The core network node of claim 5, wherein sending the second capability ID and the set of UE capabilities configures the access network to connect with the UE.

8. The core network node of claim 5, wherein the core network node is an Access and Mobility management Function (AMF) of the wireless network.

* * * * *